Figure 1:
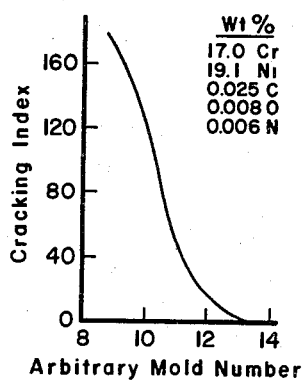

Jan. 21, 1964  F. C. HULL  3,118,761
CRACK RESISTANT AUSTENITIC STAINLESS STEEL ALLOYS
Filed Feb. 5, 1960  2 Sheets-Sheet 1

WITNESSES
John E. Hensley Jr.
H M Snyder

INVENTOR
Frederick C. Hull
BY
Frederick Shapoe
ATTORNEY

United States Patent Office 3,118,761
Patented Jan. 21, 1964

3,118,761
CRACK RESISTANT AUSTENITIC STAINLESS
STEEL ALLOYS
Frederick C. Hull, Penn Hills Township, Allegheny
County, Pa., assignor to Westinghouse Electric Corporation, East Pittsburgh, Pa., a corporation of Pennsylvania
Filed Feb. 5, 1960, Ser. No. 7,043
5 Claims. (Cl. 75—128)

This inveniton is directed to stainless steel alloys having improved resistance to crack formation in the as-cast, or as-welded condition, and to articles including castings, wrought members, weld rods and welded structures made from such alloys.

The solidification of metals from the molten condition is often accompanied by the formation of cracks which tend to impair or destroy the usefulness of the article manufactured. This cracking phenomenon is termed "hot tearing" when it occurs in castings, and "hot cracking" or "microfissuring" when it occurs in welds.

Hot tearing often occurs when a casting of complex shape is poured into a mold which is too rigid to allow free contraction of the casting during cooling, especially if there are long, thin sections adjacent to heavier sections.

The problem of hot cracking of weld metal is particularly acute in the field of high-temperature, high-stress applications where welds must be made joining heavy sections of stainless steel held under restraint. Steam turbines, boilers, and chemical processing equipment are examples of applications involving this type of welding.

A related cracking phenomenon occurs in the heat-affected zone of the base metal during welding of heavy sections. The volume of base metal adjacent the weld undergoes rapid heating to a temperature close to the melting point followed by cooling to ambient temperature. This rapid heating and cooling cycle, combined with the stresses imposed by hindered thermal contraction, has been found to severely damage the base metal of many stainless steels of the prior art.

Stainless steel of the AISI types 304, 316, 321 and 347 were developed many years ago to resist general corrosion, pitting and grain boundary attack. When it became evident that these austenitic stainless steels, and in particular AISI types 316, 321 and 347 had much higher creep strength than ferritic steels, they were applied in many high-temperature, high-stress situations as the best available materials.

The application of fully austenitic alloys, such as the alloys of the AISI 300 series mentioned above, is limited by the susceptibility of the alloys to hot cracking and base metal cracking when welded, especially during the welding of restrained joints, and to hot tearing when cast.

Since the apparatus used at elevated temperatures, such as steam-turbine piping, steam chests, and chemical equipment includes many welded joints, the problems of base-metal cracking, hot cracking, and hot tearing, have been the subject of intense investigation. Wide variation has been found in the susceptibility to cracking even within a given grade of steel, and there is as yet, no satisfactory explanation for this variation. This uncertainty as to the quality of the welded joints means that excessive time and money must be spent for testing and inspection to prevent service failures in critical applications such as have been mentioned above.

In order to provide a technique for conveniently and quantitatively evaluating the hot tearing and hot cracking characteristics of alloys, I have developed the cast pin tear (CPT) test which has been fully described in the Welding Journal, volume 38, April 1959, pages 176-S to 181-S. In brief, this test involves casting small samples of an alloy, in a series of copper molds graduated in size, under conditions which impose a tensile strain on the sample as the mold expands and as the casting contracts during solidification and cooling. The geometry of the particular mold that will produce a certain degree of hot cracking provides a means of classifying alloys in order of merit or of predicting service performance.

From an examination at some magnification of the surface cracking of the pins after cooling, the cumulative percentage of circumferential cracking, designated "cracking index," is determined and plotted against arbitrary mold numbers to provide a measure of the susceptibility of the alloy to cracking. The molds are graduated so as to serially progress in relatively regular steps from long, slender molds to short heavy molds. The long slender molds (of the aforementioned series), which have smaller arbitrarily assigned numbers, produce severe cracking, whereas short, heavy-walled molds, which have the larger arbitrarily assigned numbers, crack the pin less severely, or not at all. The results of the CPT tests have been found to have good correlation with the performance of weld metals in actual welds. Therefore, results obtained from this test may properly be used to evaluate the relative merits of alloys insofar as hot cracking and hot tearing are concerned.

Because the CPT test is based on the resistance of a cast structure to cracking, it is not difficult to understand the correlation found between the test results and the actual hot cracking of welds and hot tearing of castings. The ability to predict cracking behavior in the heat-affected zone of a wrought alloy during welding from the same test results is not nearly as obvious and thus deserves further comment.

One technique currently used to predict the weldability of wrought stainless steel is the Rensselaer Polytechnic Institute (RPI) hot ductility test, described in "Further Studies on the Hot Ductility of High-Temperature Alloys," Welding Research Council Bulletin Series, No. 33, February 1957. In this test, ¼" diameter specimens of an alloy are heated, by passing a large electric current through them, through a time-temperature cycle that simulates conditions in the heat-affected zone of a weld. When the specimens are pulled at different temperatures of this cycle it is usually found that heating close to the melting point has damaged the material, as evidenced by a decrease in its ductility on cooling compared to the ductility measured at equivalent temperatures on heating.

A correlation has been established between the cracking susceptibility of stainless steels as measured by the CPT test and the performance in the RPI hot ductility test when the maximum temperature on heating is that at which the strength drops to zero. Without going into the details of a procedure not a part of this invention, it should be understood that it is now possible to predict the behavior of austenitic stainless steels in the heat-affected zone of the base metal from the results obtained in the CPT test. Thus, the CPT test may be used to evaluate austenitic stainless steels for crack resistance in castings, weld metal, and the base metal adjacent to welds.

Another problem associated with austenitic stainless steels is that when subjected to temperatures in the range of from 800° F. to 1600° F. they exhibit a phenomenon known as sensitization. This involves the precipitation of chromium carbides at the grain boundaries with resulting depletion of chromium in the immediate vicinity of the grain boundaries exposing that area to accelerated localized corrosion. For many years titanium and columbium have been used to stabilize the carbides in stainless steels and thus prevent this undesired intergranular corrosion.

Ferrocolumbium is the customary addition to stainless steels to provide the necessary amount of columbium. Since tantatlum is present naturally in small amounts of the order of a few percent in ferrocolumbium, tantalum is a usual, though minor, component of type 347 steels. It is even common to report the chemical analysis as (Cb+Ta), though the columbium is the basically desired additive. Tantalum, which is similar to columbium in many respects in its alloying effects, has been reported to have several disadvantages as a stabilizer. The disadvantages mentioned are : (1) higher cost, (2) more losses during melting of the steel, (3) more losses during covered-electrode welding, and (4) twice as much (weight percent) required, compared with columbium, to combine with the carbon for effective stabilization. As the result of these known disadvantages without known compensating advantages, tantalum-stabilized stainless steels have not been produced commercially.

I have discovered that tantalum may be incorporated in certain stainless steel compositions to produce a steel having high resistance to hot cracking and microfissuring, either when cast or welded, and also having stabilized carbides.

It is a primary object of this invention to provide stabilized austenitic stainless steel wrought alloys suitable for welding and having improved resistance to hot cracking which include, in predetermined proportions, the elements iron, chromium, nickel, and manganese in combination with tantalum in an amount to stabilize the carbon therein.

It is a further object of this invention to provide a welding rod capable of depositing a stabilized stainless steel weld bead having an essentially austenitic structure and being free from cracking, which includes, in predetermined amounts, the elements iron, chromium, nickel, and manganese in combination with tantalum in an amount to stabilize the carbon therein.

It is an object of this invention to provide a stainless steel alloy suitable for weld rod and wire, and castings, having improved resistance to cracking, the alloy including, in predetermined amounts, the elements iron, chromium, nickel, and manganese in combination with tantalum in an amount to stabilize the carbon therein, and having a predominantly austenitic structure with from about 2% to 10% delta ferrite therein as-cast or as-deposited in a weld.

Still another object of this invention is to provide a high-strength stabilized austenitic stainless steel alloy for wrought members, castings and welding electrodes having good resistance to hot cracking during casting and welding which includes in predetermined amounts the elements iron, chromium, nickel, manganese in combination with tantalum in an amount to stabilize the carbon therein, and a solid solution hardening addition comprising at least one element of the group consisting of molybdenum, tungsten, and vanadium.

Another object of this invention is the provision of a unitary welded structure consisting of a plurality of members welded together, the members composed of a stabilized austenitic stainless steel alloy which includes, in predetermined amounts, the elements iron, chromium, nickel and manganese in combination with tantalum in an amount to stabilize the carbon therein.

Other objects of this invention, will, in part, be obvious, and will, in part, appear hereinafter.

Figure 2:
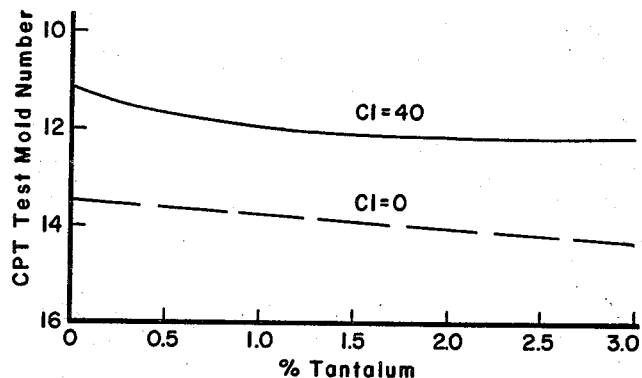
Figure 3:
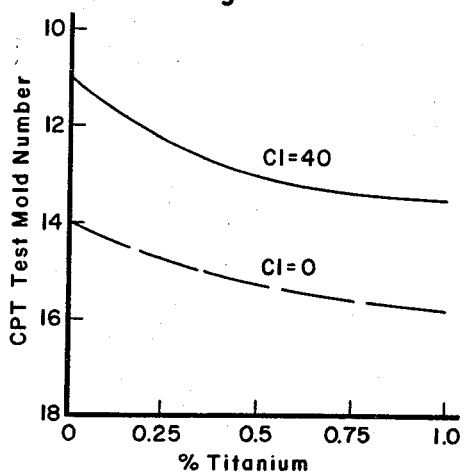
Figure 4:
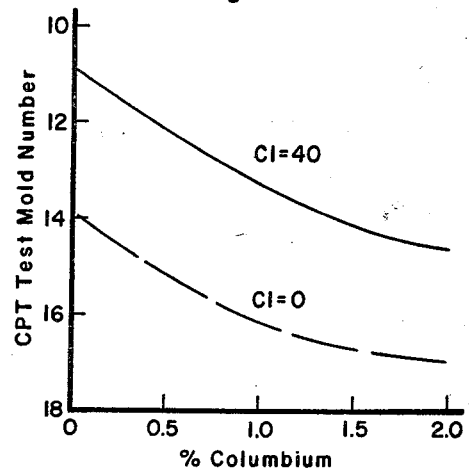
Figure 5:
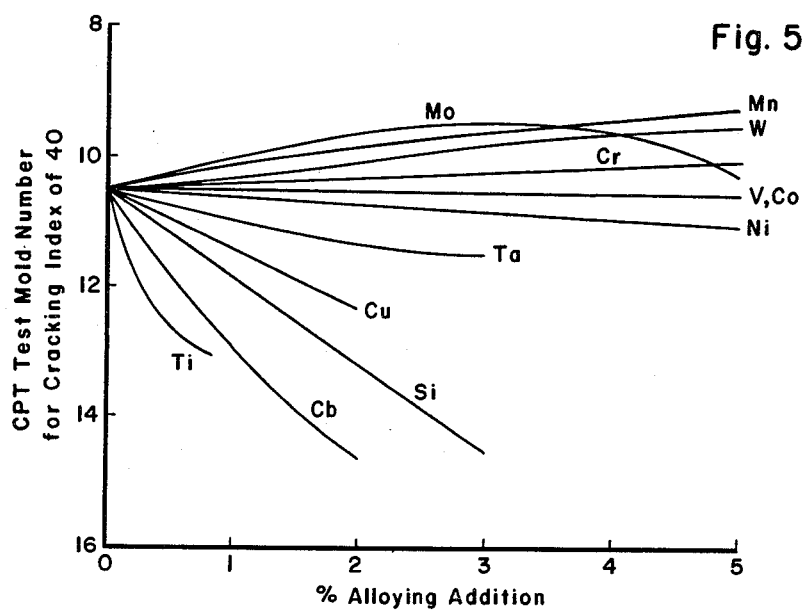
Figure 6:
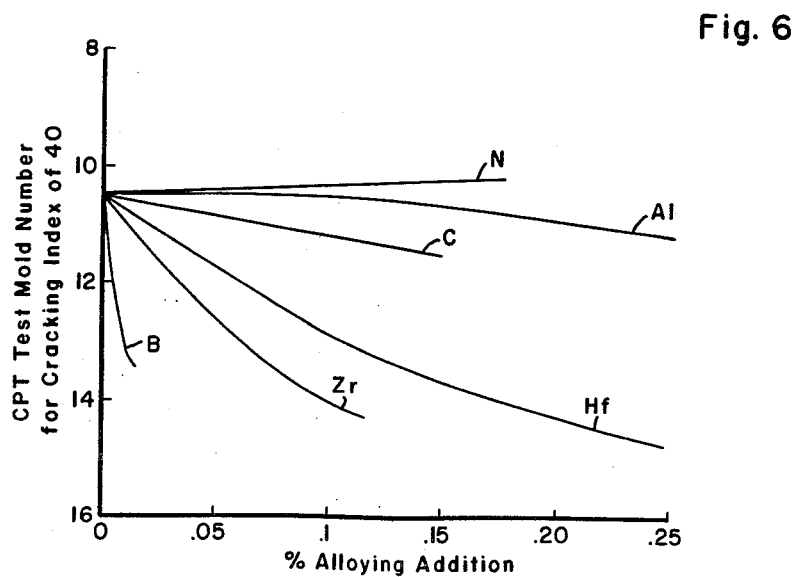

A clearer understanding of important aspects of this invention may be gained by reference to the drawings, in which:

FIGURE 1 is a typical CPT test curve in which the cracking index is plotted against arbitrary mold numbers, FIGS. 2 through 4 are hot cracking curves for the stabilizing elements tantalum, titanium and columbium, in which mold numbers for cracking indices of 40 and 0 are plotted against weight percent of the individual element, and FIGS. 5 and 6 are graphs plotting CPT test mold numbers for a cracking index of 40 against weight percent of some common alloying additives in stainless steel.

This invention is directed to stabilized austenitic stainless steel alloys which exhibit high resistance to cracking as determined by the CPT test and in actual casting and welding operations. More particularly, the invention is directed to alloys, particularly in the form of castings, wrought members, welding rods, welding wire, and welded unitary structures, composed of a stabilized, substantially austenitic stainless steel comprising, by weight, from 12% to 25% chromium, from 5% to 30% nickel, from 0.3% to 20% manganese, from 0.2% to 3% tantalum, up to .2% carbon, up to .2% nitrogen, up to 2% silicon, and the balance iron and incidental impurities. The raw materials used in the preparation of these alloys may contain small amounts of columbium or titanium or both, and these elements may be present in the alloys of this invention in a total amount of up to one-fifth the amount of tantalum without appreciably altering the essential characteristics of the alloys. Further, an element selected from the group consisting of molybdenum, in amounts of up to 8%, tungsten in amounts of up to 10%, and vanadium in amounts of up to 4%, may be added to the above alloy to increase its strength and hardness. Combinations of two or all three of the latter elements may be employed up to 8% "equivalent molybdenum," calculated as actual molybdenum plus one half the tungsten plus twice the vanadium, all taken in weight percent. This relationship may also be indicated as follows:

$$(\text{Percent Mo}) + \left(\frac{\text{percent W}}{2}\right) + 2\ (\text{percent V}) \leq 8\%$$

A preferred composition range for the alloys of this invention comprises, by weight, from 14% to 20% chromium, from 6% to 22% nickel, from .3% to 20% manganese, from 0.4% to 2% tantalum, up to 0.1% carbon, up to .1% nitrogen, up to 1% silicon, and the balance essentially iron with incidental impurities.

Another preferred composition range for the alloys of this invention comprises, by weight, from 14% to 20% chromium, from 6% to 22% nickel, from 6% to 18% manganese, from 0.4% to 2% tantalum, up to 0.1% carbon, up to .1% nitrogen, up to 1% silicon, and the balance essentially iron with incidental impurities. In some cases an even narrower range of manganese, from 9% to 15%, is found to be desirable.

In FIG. 1, hot-cracking data as obtained in the CPT test for a ternary iron-chromium-nickel alloy are graphically presented. This is a typical CPT test curve, and it will be noted, that long, slender molds (which have the smaller assigned numbers) produce severe cracking, whereas short, heavy-walled molds (which have the larger numbers) crack the pin less severely or not at all. The cracking index or cumulative percentage of circumferential cracking for this alloy ranges from 0 to nearly 180. A cracking index of 40 has been found to be convenient as a basis for the purpose of comparison of alloys, although, of course, a cracking index of 0 could be used equally well. It will be noted that the ternary alloy tested in FIG. 1 has a cracking index of 40 at mold number 11.

FIGS. 2 through 4 illustrate the effect of several alloying additions on the hot-cracking characteristics of the ternary alloy of FIG. 1 set forth in terms of mold number at a cracking index of 40.

The alloys listed in Table I below were used as base metals to study the effect of varying quantities of tantalum on susceptibility to cracking. These twenty-five pound master heats were induction melted in vacuum. A high nickel content of approximately 20% was selected for the base composition so that even with substantial additions of tantalum, titanium, and columbium the alloy would remain fully austenitic as-cast, and the effects of the individual alloying element would not be obscured by variable amounts of delta ferrite in the structure.

For the CPT tests, the tantalum addition was made by doping a small quantity of material from the master heats with the indicated amount of tantalum, and levitation melting the whole in argon. Additions of 0.03%, 0.1%, 0.3% and 1.0% Ta were made to VM 300 and 2.0% and 3.0% Ta to VM 430.

These alloys were subjected to the CPT test, and from the data obtained, the curves in FIG. 2 were plotted.

*Table I*

COMPOSITIONS OF MASTER ALLOYS IN WEIGHT PERCENT

| Heat No. | Cr | Ni | Mn | Si | C | N | P | S | O₂ | Fe |
|---|---|---|---|---|---|---|---|---|---|---|
| VM 300 | 17.0 | 19.1 | .003 | <.03 | .025 | .0058 | .0010 | .004 | .0008 | Bal. |
| VM 430 | 15.8 | 20.0 |  |  | .001 | .002 |  |  | .0045 | Bal. |

Similar series of alloys containing titanium and columbium, individually in place of the tantalum, were made and tested, and the curves in FIGS. 3 and 4 were plotted from these results.

In FIG. 2, the mold number at a cracking index of 40 does not materially exceed 12 for tantalum additions up to 3%. In FIG. 3, the test mold number approaches 14 at a cracking index of 40 for titanium additions of up to 1%. In FIG. 4, the test mold number exceeds 14 at a cracking index of 40 for columbium additions up to 2%. The lower the CPT mold number the better the alloy from the cracking standpoint. Also, in FIGS. 2 to 4 there are shown the curves for a cracking index of 0 for each of the alloys.

Contrary to the generally held belief, then, it is clear from FIGS. 2 and 4 that additions of columbium and tantalum are not equally desirable insofar as hot-tearing and hot-cracking of the alloy is concerned. Further, it may fairly be stated that, from the tests leading to the curves of FIGS. 2, 3 and 4, while additions of tantalum adversely affect the cracking characteristics of stainless steels, this effect is much less marked than in the case of columbium or titanium additions. These data establish that the addition of columbium and titanium even in moderate amounts markedly increases the cracking characteristics of stainless steels whereas equal or even larger amounts of tantalum cause only a small increase in the cracking characteristics of the same steels. Consequently, steels containing tantalum additions are much more resistant to hot-cracking than the same steels containing similar amounts of either titanium or columbium and can be used as base metal or electrodes, or both, in producing crack-free welded structures under a greater degree of restraint than can be fabricated with alloys of type 321 and type 347 steels.

Where resistance to corrosion, which is correlated to carbide precipitation, is a primary consideration, the tantalum content should amount to from about ten to twenty times the carbon content. Where high temperature strength is the primary consideration, the amount of tantalum in the alloy may be less than that indicated above, and still provide adequate strength.

The merit of the tantalum addition to stainless steels is also demonstrated by the following CPT test results on another group of alloys prepared by melting compacts of pure metal powders. Data are presented for alloys that are fully austenitic as-cast and also for alloys containing about 6% to 10% delta ferrite.

*Table II*

COMPARISON OF THE EFFECTS OF STABILIZING ELEMENTS ON SUSCEPTIBILITY TO HOT CRACKING OF STAINLESS STEELS

| Composition, weight percent principal constituents, balance Fe | Percent delta ferrite as-cast | CPT test mold No. for cracking index=40 |
|---|---|---|
| 16Cr-20Ni | 0 | 11.0 |
| 16Cr-20Ni+1Ta | 0 | 11.5 |
| 16Cr-20Ni+1Cb | 0 | 13.5 |
| 16Cr-20Ni+0.75Ti | 0 | 13.0 |
| 16Cr-14.5Ni-11Mn-2Mo | 0 | 8.0 |
| 16Cr-14.5Ni-11Mn-2Mo+1Ta | 0 | 8.6 |
| 16Cr-14.5Ni-11Mn-2Mo+1Cb | 0 | 10.2 |
| 16Cr-14.5Ni-11Mn-2Mo+1Ti | 0 | 10.4 |
| 16Cr-10Ni-11Mn-2Mo | 7.3 | 7.5 |
| 16Cr-10Ni-11Mn-2Mo+1Ta | 6.6 | 8.0 |
| 16Cr-10Ni-11Mn-2Mo+1Cb | 6.6 | 9.5 |
| 16Cr-10Ni-11Mn-2Mo+1Ti | 10.4 | 9.5 |

The effect of delta ferrite on cracking, which is well known in the art, is likewise demonstrated in Table II where it is seen that alloys containing delta ferrite have lower CPT test mold numbers than similar fully austenitic alloys. It will be noted that in the steels containing delta ferrite, tantalum is again the preferred stabilizing element.

It is considered that a difference of one or more mold number is a truly significant difference in the cracking characteristics of alloys. Fractional mold numbers are not entirely reliable indications of real differences in cracking characteristics. Thus, in Table II, the tantalum-containing steels have a crack resistance which is so close (averaging about ½ a mold number higher) to the crack resistance of steels without any stabilizing additive, that the two are substantially equal in this property. The columbium-containing and titanium-containing steels are so much inferior in mold number that there is no question of their degraded crack resistance property. With the tantalum addition, then, it is possible to obtain a stabilized steel without materially increasing the susceptibility to cracking of the ternary iron-chromium-nickel steels or of stainless steels alloyed in addition with manganese or manganese with molybdenum.

Referring to FIGS. 5 and 6 showing the effect of various elements on cracking of a 16% chromium, 20% nickel stainless steel, FIG. 5 clearly demonstrates that each element exerts an individual effect on the hot-cracking characteristics of the basic alloy which, in many cases, is substantially different from that of the other elements tested. For example, manganese, molybdenum, tungsten and chromium materially increase the resistance to cracking, each to a different degree. On the other hand, copper and silicon have a pronounced deleterious effect, each to a different extent. Cobalt and vanadium are almost identical in their results and do not appear to be either beneficial or deleterious. Hence, cobalt may be substituted for equal amounts of nickel up to at least 5% without detracting from the basic characteristics of the alloys. Nickel shows only a slight detrimental effect. The curves for tantalum, columbium and titanium are also included in FIG. 5 to permit comparison with the effects of the other elements.

Similar information to that of FIG. 5 is presented with respect to certain other elements in FIG. 6. It should be noted that the horizontal scale indicating the amounts of the elements covers only up to 0.25% in this figure, whereas in FIG. 5 the scale for alloying elements went up to 5%. It is quite apparent that even small amounts of boron are highly detrimental. Also zirconium and hafnium, even in small fractions of 1%, greatly impair the cracking resistance of the alloy.

From other tests made, the beneficial or detrimental effects of the additives shown in FIGS. 5 and 6 for the 16% chromium, 20% nickel, balance iron alloys, have been determined to be similar for stainless alloys having other proportions of nickel, chromium, iron and tantalum.

As a result of the quantitative relationships which have been established, I have invented compositions of fully austenitic tantalum-stabilized stainless steels which possess high resistance to cracking. In the basic composition, high resistance to hot cracking as well as good mechanical properties are obtained when the chromium content is as high as it can be without giving rise to delta ferrite and the sigma phase, and when nickel is as low as it can be without similarly producing delta ferrite. Manganese should preferably be maintained at a high level (as will be described more fully later). Aluminum and silicon should be maintained at a low level. The solid solution hardeners molybdenum, tungsten and vanadium can be added in relatively large amounts to obtain high strength. Molybdenum up to about 5% (optimum around 2 to 3%) and tungsten up to about 10% (optimum around 5 to 6%) actually increase the resistance to cracking while vanadium does not adversely affect the cracking characteristics in any amount up to 5%. Of the austenite stabilizers and strengthening elements, carbon and nitrogen, nitrogen is to be preferred over carbon because it reduces hot cracking whereas carbon slightly increases the amount of cracking. The carbide stabilizers titanium and columbium drastically increase the susceptibility of the alloy to hot cracking. Therefore, in the novel stabilized stainless steels of this invention, I employ tantalum to increase strength or to prevent intergranular corrosion of as-welded structures or materials heated in the sensitizing temperature range. The amount of tantalum added should be restricted to as low a level as possible, in the range of 0.2% to 3%, consistent with the corrosion requirements. Because carbon is detrimental to hot cracking and also increases the amount of tantalum needed for stabilization, it is preferred to keep the carbon content as low as is practical, when it is desired to obtain the maximum resistance to cracking in a stabilized steel.

Certain elements, such as boron and zirconium, which are sometimes added to austenitic stainless steels to obtain particular characteristics, are especially potent in increasing hot tearing and cracking, and, therefore, whenever these elements are added to an alloy in which the hot cracking property is of importance, care should be taken to restrict the amount of these elements to the lowest level consistent with attaining the desired result. The effect of hafnium on cracking is similar to that of zirconium.

Manganese is a highly desired component in the alloys of this invention and may be present in relatively large amounts. The data in Table III show a marked decrease in CPT test mold number as manganese is increased from essentially zero to 6.64%, and finally, 13.0% Mn. A broad preferred range of manganese for the alloys of this invention is from 6% to 18% Mn. A narrower preferred range of manganese in the alloys is from 9% to 15% Mn.

Table III

EFFECT OF MANGANESE ON THE SUSCEPTIBILITY TO HOT CRACKING OF Fe—Cr—Ni—Ta STAINLESS STEELS

| Heat No. | Composition | | CPT test mold No. for cracking index=40 |
|---|---|---|---|
| | Percent Mn | Percent Ta | |
| VM 300+Ta | 0.003 | 0.6 | 11.7 |
| 7433 | 6.64 | 0.43 | 10.0 |
| 7434 | 13.0 | 0.47 | 8.9 |

The following elements may be present in the alloys of this invention as a result of their presence in the raw materials, slag, or refractories, or from intentional additions: columbium and titanium, the total of columbium and titanium amounting to less than one-fifth the amount of tantalum, up to .2% aluminum, up to .01% boron, up to .02% zirconium, up to 5% cobalt, up to .2% copper, and normal amounts of phosphorus, sulfur and other trace impurities commonly found in stainless steels.

The weld-bead hot cracking of the steels of this invention can be reduced considerably as shown in Table II by employing nickel contents at the lower end of the stated range so that from about 2% to 10% delta ferrite appears in the as-welded structure. Similar compositions can be used to obtain increased resistance to hot tearing of castings.

The methods for obtaining a fully austenitic structure or for controlling the amount of delta ferrite in cast alloys or weld deposits of this type are well known in the prior art. In general, the amounts of chromium and nickel are the variables most usually controlled, but other additives in the alloy will also exert an effect upon the phase relationships which must be taken into consideration. For example, if strength and/or corrosion characteristics dictate the levels of solid solution strengtheners (Mo, W, V) and the stabilizer (Ta) desired, and melting practice produces a certain level of carbon and nitrogen, of deoxidation yields about 0.5% Si, there are only nickel, chromium and manganese left to affect the structure. Since chromium must exceed about 12% to give the steels their stainless characteristics and since it will be shown that manganese has little effect on the amount of delta ferrite, the final control over the structure resides in the selection of the nickel content.

Four factors enter into the selection of the optimum nickel content for fully austenitic alloys of this invention.

(1) Because nickel increases the hot cracking susceptibility by about 0.5 CPT test mold number for every 5% excess nickel, nickel should be kept low.

(2) In wrought products it is desired to keep delta ferrite out of the cast ingot or wrought material in order to maintain good workability. Hence, nickel should be high enough to insure a fully austenitic structure.

(3) When highly restrained joints are welded with a ferrite-containing electrode, if the nickel content of the base metal is too high, dilution of the weld bead by the base metal will decrease or eliminate the delta ferrite from the weld and may cause hot cracking. From this standpoint the base metal should be as low in nickel as item (2) will permit.

(4) Finally, from practical considerations, higher nickel than needed for item (2) is uneconomical and wasteful.

For the composition ranges covered by this invention, I have determined the nickel equivalents of the various additives so that a fully austenitic alloy or one having a predetermined delta ferrite content can be obtained as desired. If a plus is used to designate an austenite-forming tendency and a minus to designate a delta ferrite-forming tendency, the common alloying elements in my steels have the following factors (based on a value of +1 for nickel).

Table IV

AUSTENITE (+) AND DELTA FERRITE (−) FORMING TENDENCIES OF ALLOYING ELEMENTS

| Element: | Factor |
|---|---|
| V | −2.0 |
| Ti | −1.6 |
| Mo | −0.8 |
| Cr | −0.7 |
| W | −0.5 |
| Si | −0.4 |
| Cb | −0.1 |
| Ta | −0.1 |
| Mn | +0.02 |
| Ni | +1.0 |
| C | +27 |
| N | +27 |

Using the above values the following equation has been derived which enables one to predict the microstructures of castings and weld deposits of alloys of this invention. When the composition function, $F(c)$, in the following equation exceeds about 13 to 14 the alloy will be substantially austenitic, whereas when it lies between 7.5 and 11.5 the alloy will contain about 10% to 2% delta ferrite. The smaller values of $F(c)$ correspond to larger amounts of delta ferrite.

$F(c) =$ (percent Ni) $+0.02$ (percent Mn) $+27$ (percent C+ percent N) $-2.0$ (percent V) $-1.6$ (percent Ti) $-0.8$ (percent Mo) $-0.7$ (percent Cr-16) $-0.5$ (percent W) $-0.4$ (percent Si) $-0.1$ (percent Cb) $-0.1$ (percent Ta)

Thus, the 16Cr—10Ni—11Mn—2Mo—1Ta alloy of Table II had a $F(c)$ value of 8.9, and a casting made from this material had 6.6% of delta ferrite, while alloy 7404 of Table V had a $F(c)$ value of 13.8, and the casting made from this material had no delta ferrite.

Tantalum, per se, has a very small effect on the amount of delta ferrite. However, there is an interaction between Ta and (C and/or N) such that if both are present in substantial amounts, carbon and nitrogen appear to be removed from solution as carbides and nitrides and ferrite appears in the microstructure at somewhat higher nickel contents than predicted by the equation.

The small effect found for manganese on delta ferrite formation is in distinct contrast with the teachings of the prior art. The temperature of the austenite to martensite transformation ($M_s$) is, however, lowered by manganese.

In accordance with the general principles outlined, a series of tantalum-containing alloys was prepared. These twenty-five pound air induction melted heats, had the following compositions and hot cracking ratings as determined by the CPT test. The general characteristics of the small heats were subsequently verified in a 3000 pound heat designated XMM2009. These data are listed in Table V, below.

The tensile properties of heat XMM2009 from room temperature to 2200° F. are listed in Table VI. The specimens were cut in the longitudinal direction from a ¾″ thick hot-rolled plate which was solution heat treated one hour at 2100° F. There are two minor dips in ductility, one at about 1350° F. and one at about 1800° F. to 2000° F. Since the minimum reduction of area up to 2200° F. is greater than 40%, this wrought alloy is sufficiently ductile to withstand all normal fabrication and service imposed strains, including annealing and stress-relief heat treatment of restrained joints in heavy welded sections.

The tensile properties of the other alloys in Table V were studied in the same detail on ⅝″ diameter hot-rolled bars, solution treated to give about an ASTM No. 5 grain size. Because of the similarity of these results to the example above, only the properties at room temperature, 1100° F. and 2000° F. are listed in Table VII. All of the wrought alloys of this invention exhibited excellent tensile ductility up to 2200° F.

Table V
COMPOSITIONS (WT. PERCENT) AND CPT TEST RATING

| Heat No. | CPT* test Mold No. | Cr | Ni | Mn | Si | Mo | W | V | Ta | C | N | Fe |
|---|---|---|---|---|---|---|---|---|---|---|---|---|
| 7394 | 8.8 | 16.3 | 13.9 | 12.1 | 0.2 | 1.63 | | | 0.46 | 0.0093 | 0.031 | Bal. |
| 7404 | 8.7 | 16.5 | 14.0 | 11.9 | 0.12 | 1.49 | | 0.91 | 0.54 | 0.08 | 0.032 | Bal. |
| 7406 | 9.0 | 16.4 | 14.0 | 12.0 | 0.16 | 1.48 | 0.93 | 0.96 | 0.58 | 0.072 | 0.03 | Bal. |
| 7407 | 8.7 | 16.4 | 14.1 | 13.8 | 0.18 | 2.80 | 0.36 | 0.38 | 0.69 | 0.071 | 0.037 | Bal. |
| 7409 | 8.5 | 17.0 | 15.9 | 14.6 | 0.13 | | | 2.84 | 0.75 | 0.007 | 0.042 | Bal. |
| 7433 | 10.0 | (16) | (20) | 6.64 | (.15) | | | | 0.43 | 0.0051 | 0.015 | Bal. |
| 7434 | 8.9 | (16) | (20) | 13.0 | (.15) | | | | 0.47 | 0.0077 | 0.013 | Bal. |
| 7437 | 9.5 | (16) | (20) | 12.9 | (.15) | | | | 1.00 | 0.0035 | 0.017 | Bal. |
| 7435 | 10.3 | (16) | (20) | 6.51 | (.15) | 2.66 | | | 0.53 | 0.0021 | 0.014 | Bal. |
| 7436 | 10.0 | 16.1 | 20.3 | 10.7 | 0.12 | 2.72 | | | 0.44 | 0.067 | 0.016 | Bal. |
| 7438 | 8.9 | (16) | (20) | 10.6 | (.15) | 2.66 | | | 0.48 | 0.044 | 0.082 | Bal. |
| 7449 | 8.4 | (16.0) | (7.0) | (11.5) | (0.15) | (1.5) | | | (0.6) | (0.03) | (0.08) | Bal. |
| 7450 | 9.6 | (18.0) | (17.0) | (12.0) | (0.15) | (6.0) | | | (0.5) | (0.03) | (0.08) | Bal. |
| XMM2009 | 9.8 | 15.8 | 20.3 | 11.0 | 0.23 | 2.78 | | | 0.93 | 0.055 | 0.017 | Bal. |

( ) Indicates nominal composition.
*Mold No. for cracking index of 40.

Table VI
TENSILE PROPERTIES OF HEAT XMM2009
[Strain rate 750% per hour; specimen 0.357″ dia., 1½″ gage length]

| Test temp., ° F. | 0.5% yield strength, p.s.i. | Ultimate strength, p.s.i. | Percent elongation | Percent reduction of area |
|---|---|---|---|---|
| RT | 36,700 | 85,100 | 55.8 | 76.8 |
| 1,100 | 22,000 | 64,900 | 47.3 | 66.5 |
| 1,350 | 19,900 | 46,100 | 33.8 | 43.2 |
| 1,600 | 22,100 | 23,900 | 60.6 | 56.5 |
| 1,800 | 14,200 | 14,600 | 44.9 | 56.9 |
| 2,000 | 7,700 | 7,800 | 72.8 | 52.4 |
| 2,200 | 3,600 | 3,700 | 103.6 | 76.8 |

Table VII

TENSILE PROPERTIES

[Strain rate 750% per hour; specimen 0.357" dia., 1½" gage length]

| Heat No. | Test temp., °F. | 0.5% yield strength, p.s.i. | Ultimate strength, p.s.i. | Percent elongation | Percent reduction of area |
| --- | --- | --- | --- | --- | --- |
| 7394 | RT | 29,700 | 75,700 | 60.5 | 76.3 |
|  | 1,100 | 19,300 | 51,500 | 40.2 | 70.3 |
|  | 2,000 | 4,400 | 5,300 | 94.7 | 63.6 |
| 7404 | RT | 37,200 | 84,700 | 56.8 | 75.8 |
|  | 1,100 | 18,900 | 64,400 | 42.8 | 63.5 |
|  | 2,000 | 6,300 | 6,800 | 49.0 | 57.9 |
| 7406 | RT | 37,200 | 85,600 | 54.5 | 73.0 |
|  | 1,100 | 19,200 | 67,600 | 44.8 | 60.4 |
|  | 2,000 | 6,900 | 7,500 | 46.5 | 49.5 |
| 7407 | RT | 38,600 | 86,400 | 54.0 | 67.4 |
|  | 1,100 | 19,100 | 65,900 | 47.5 | 59.7 |
|  | 2,000 | 7,300 | 7,500 | 34.7 | 42.4 |
| 7409 | RT | 31,600 | 79,200 | 50.6 | 73.1 |
|  | 1,100 | 13,600 | 55,600 | 45.4 | 62.3 |
|  | 2,000 | 4,600 | 5,200 | 41.7 | 41.6 |
| 7433 | RT | 23,500 | 70,400 | 56.3 | 77.7 |
|  | 1,100 | 12,400 | 44,900 | 42.2 | 74.7 |
|  | 2,000 | 4,200 | 5,800 | 91.1 | 61.9 |
| 7434 | RT | 24,500 | 71,300 | 56.5 | 77.2 |
|  | 1,100 | 11,700 | 47,400 | 44.1 | 71.5 |
|  | 2,000 | 4,800 | 6,000 | 56.8 | 46.4 |
| 7435 | RT | 29,000 | 77,000 | 55.0 | 76.7 |
|  | 1,100 | 13,600 | 51,900 | 43.7 | 70.9 |
|  | 2,000 | 6,000 | 7,200 | 77.3 | 52.8 |
| 7436 | RT | 37,900 | 87,000 | 53.0 | 75.6 |
|  | 1,100 | 21,500 | 66,200 | 41.2 | 66.6 |
|  | 2,000 | 6,900 | 7,100 | 72.3 | 60.5 |
| 7437 | RT | 26,600 | 74,600 | 54.0 | 75.8 |
|  | 1,100 | 13,500 | 51,500 | 41.6 | 72.7 |
|  | 2,000 | 5,200 | 6,100 | 61.8 | 57.3 |
| 7438 | RT | 44,400 | 94,400 | 49.6 | 72.1 |
|  | 1,100 | 24,800 | 71,200 | 44.7 | 65.6 |
|  | 2,000 | 6,900 | 7,000 | 67.6 | 52.8 |

Specimens for RPI type hot ductility tests were prepared from certain of the alloys in Table V. In the case of heat Nos. 7404, 7406, 7407, and 7409 the specimens were machined from ⅜" dia. hot-rolled bars. In the case of XMM2009 the specimens were cut ¾" thick hot-rolled plate. All of the alloys showed a rapid recovery of ductility on cooling even after being heated above the solidus temperature, indicating a low potential susceptibility to cracking in the heat-affected zone of the base metal during welding.

The creep rupture properties of certain of the wrought alloys of this invention are set forth below in Table VIII, together with similar published properties of certain standard stainless steel alloys.

Table VIII

1000 HOUR CREEP RUPTURE PROPERTIES AT 1200° F.

| Heat No. | Stress for rupture in 1,000 hours, p.s.i. | Rupture strain, percent |
| --- | --- | --- |
| 7404 | 31,000 | 22 |
| 7406 | 34,000 | 16 |
| 7407 | 30,000 | 20 |
| 7409 | 23,000 | 16 |
| 7436 | 27,000 | 38 |
| 7433 | 27,000 | 20 |
| XMM2009 | 24,000 | 16 |
| 18Cr–8Ni | 17,000 | 16 |
| 18Cr–8Ni–Ti | 18,000 | 15 |
| 18Cr–8Ni–Cb | 23,000 | 9 |
| 18Cr–8Ni–Mo | 24,000 | 17 |

This table clearly shows the superior creep-rupture properties of the alloys of this invention at elevated temperatures. This high level of strength is especially remarkable, considering the high resistance to hot cracking also possessed by these alloys.

From a study of the tensile and creep-rupture properties of the alloys whose compositions are listed in Table V, it is possible to draw some conclusions about the effects of the different alloying elements on the high temperature strength of these stainless steels. The primary effect of manganese in these alloys is to reduce hot cracking, since even large amounts only slightly increase the strength. If carbon and nitrogen are below about 0.025% total C+N, tantalum is not a particularly potent strengthener. However, when C+N exceeds about 0.06% in the presence of tantalum, the strength increases very rapidly and does not seem to depend too greatly on the tantalum content as long as tantalum is greater than about 0.40%. Molybdenum, tungsten and vanadium increase strength appreciably in the solid solution range and approximately in proportion to the calculated "equivalent molybdenum" content. It was noted however, that at "equivalent molybdenum" contents above about 4 to 5%, a hard, second phase appeared in the microstructure. In wrought alloys this phase was well distributed as fine spheres throughout the structure, and it produced marked increases in both strength and creep-rupture ductility. At the higher levels of "equivalent molybdenum," e.g., at 5 to 8%, the elements molybdenum, tungsten and/or vanadium produce a form of dispersion hardening as well as solid solution hardening. It was also observed that increases in chromium content or increases in manganese content gave rise to the appearance of the dispersed second phase at "equivalent molybdenum" contents less than 4%.

The stainless steel welding electrodes or wire of this invention will ordinarily be used in conjunction with inert-gas shielding. However, covered electrodes may be used if the composition of the rod or coating is adjusted to compensate for the loss of tantalum which occurs during such welding. Cast or wrought base metal of this invention, may also be welded with certain conventional welding electrodes and by appropriate commercial processes, including resistance welding.

As an example of the welding characteristics of the alloys of this invention a ⅝" thick grooved plate of heat No. 7394 was welded with 1/16" dia. wire of the same nominal composition (heat No. 7395) using 35 cu. ft./hr. of welding grade argon as a protective shield. The electrode was positive. Voltage was 27 volts and the current was 300 amperes. Welding was commenced on a cold plate; subsequent passes were started at about 200° F. Both the base metal and the as-deposited weld were fully austenitic. Specimens for side bend tests were cut across the weld and polished. No fissures were observed at 30 times magnification after bending, either in the weld bead or the heat-affected zone of the base metal.

All weld metal tensile specimens, made from deposits of heat No. 7395 wire, were cut from the filled grooves in the welded plates and were solution treated one hour at 2000° F. and water quenched. The tensile properties of the weld metal given in Table IX are similar to those of the base metal and the weld has good ductility also. The soundness of the weld deposit was further demonstrated by the absence of microfissures on the surface of the room temperature tensile specimen after test.

Table IX

TENSILE PROPERTIES OF ARGON SHIELDED WELD DEPOSIT OF HEAT NO. 7395

| Test temp., °F. | 0.5% yield strength, p.s.i. | Ultimate strength, p.s.i. | Percent Elongation | Percent reduction of area |
| --- | --- | --- | --- | --- |
| RT | 31,800 | 67,200 | 50.2 | 68.0 |
| 1,350 | 15,300 | 32,300 | 35.6 | 48.0 |
| 1,600 | 18,100 | 21,500 | 25.0 | 41.0 |
| 1,900 | 9,400 | 9,700 | 19.1 | 16.0 |

Hot-rolled plates ¾" thick of heat No. XMM2009 were solution treated one hour at 2100° F. and then grooved and welded with several alloys and procedures. The compositions of the welding rod and welding wire are given in Table X and the details of the techniques used are given in Table XI.

Table X

COMPOSITIONS OF WELDING ELECTRODES USED IN WELDING PLATES OF HEAT NO. XMM2009, WEIGHT PERCENT.

| Heat No. | Cr | Ni | Mn | Si | Mo | Ta | C | N | Fe |
|---|---|---|---|---|---|---|---|---|---|
| 7393 | 16.4 | 14.0 | 12.3 | (0.15) | 1.48 | | (0.01) | (0.02) | Bal. |
| 7395 | 16.3 | 13.9 | 12.3 | (0.15) | 1.46 | 0.66 | (0.01) | (0.03) | Bal. |
| MM1990 | 16.4 | 19.7 | 9.5 | 0.24 | 4.18 | | 0.080 | 0.024 | Bal. |

( ) Indicates nominal composition.

Table XI

PROCEDURES USED IN ARC WELDING PLATES OF HEAT NO. XMM2009

| Test No. | Electrode Heat No. | Form | Shielding | Amperes | Volts, D.C. | Electrode Polarity |
|---|---|---|---|---|---|---|
| 150-1 | 7393 | 1/16" dia. wire | Argon* | 310 | 28 | Positive. |
| 150-2 | 7393 | do | do* | 260 | 28 | Do. |
| 150-3 | 7395 | do | do* | 280 | 27 | Do. |
| 150-4 | 7395 | do | do* | 255 | 26 | Do. |
| 149-3 | MM1990 | 3/16" dia. covered electrode. | | 175 | 22 | Do. |
| 149-4 | MM1990 | 1/8" dia. covered electrode. | | 100 | 22 | Do. |

*35 cu. ft./hr. welding grade Argon.

Four side bend specimens were cut from each test weld, polished, bent and then examined at 30 times magnification. No fissures were found in the base metal or weld deposit in any specimen from any weld. In all of these cases the base metal and the weld deposits were fully austenitic.

The alloys of this invention are compatible with most austenitic stainless steels and may be used in combination with them. This is illustrated by the good results obtained with the crack-resistant electrode alloys 7393 and MM1990 of Table X, which do not contain tantalum, in the welding of tantalum-bearing plate. Equally good results may be expected when welding electrodes made of the tantalum-bearing alloys of this invention are employed to join austenitic stainless steel members containing no tantalum. Also, both types of electrodes may be used to join dissimilar austenitic stainless steel base members, that is, where one or more tantalum-containing members are to be welded to one or more members having no tantalum content.

When alloys of this invention are to be welded with any electrode which will produce delta ferrite in the weld, it is desirable that the base metal contain considerably less nickel than was added to alloys 7436, 7438 and XMM2009. A range of base-metal compositions which will achieve a balance between the requirements of hot cracking, strength, and corrosion resistance is as follows: 14% to 18% Cr, 12% to 16% nickel, 9% to 15% manganese, 0.3% to 1.0% tantalum, 1% to 3.75% "equivalent molybdenum," less than 1.0 silicon, less than 0.08% carbon, up to 0.10% nitrogen, but with carbon plus nitrogen greater than 0.06%, and the balance iron plus incidental impurities. Within this range, the austenite and ferrite forming elements should be balanced so that the composition function F(c) has a value of about 13 to 17. This adjustment is made primarily through the selection of the nickel content, as explained previously.

While the invention has been described, insofar as it applies to welding electrodes, principally in terms of the alloy compositions from which the electrodes are made, it should be understood that some of the alloying elements may be introduced into the weld deposit by additions to the electrode coating, when welding with covered electrodes.

The stainless steel alloys of this invention are suitable for foundry casting of large and complicated shapes which are subjected to restraint during solidification, since these alloys are less susceptible to hot tearing.

It is a further characteristic of the alloys of this invention that at a temperature of 1400° F. they have a hardness of less than about 130 DPH (diamond pyramid hardness).

While the above description sets forth certain beliefs and theories of how the components of the alloy compositions may be selected and proportioned, and an explanation of how certain results are obtained, it should be understood that these beliefs, theories and explanations are not controlling inasmuch as there may be other factors involved, since regardless thereof, the alloys disclosed herein possess the novel properties given independent of the explanation set forth.

It will be understood by those skilled in the art that although the present invention has been described in connection with preferred embodiments, modifications and variations may be employed without departing from the underlying spirit and scope of the invention. It is intended to claim all such variations and modifications.

I claim as my invention:

1. A stainless steel alloy suitable for wrought or cast members and for weld deposits characterized by high creep-rupture strength up to about 1200° F., by high resistance to intergranular corrosion, and by low susceptibility to hot cracking during casting or welding composed of, by weight, 12% to 25% chromium, 5% to 30% nickel, 6% to 18% manganese, from 0.2% to 3% tantalum, up to 8% "equivalent molybdenum," up to 0.1% carbon, up to 0.2% nitrogen, up to 1% silicon, up to .01% boron, up to .02% zirconium, the carbon plus nitrogen being at least 0.06%, the tantalum being at least ten times the carbon content and the balance iron with incidental impurities, the alloy comprising up to about 10% delta ferrite.

2. A stainless steel alloy suitable for wrought or cast members and weld deposits characterized by high resistance to intergranular corrosion and low susceptibility to hot cracking during casting or welding composed of, by weight, from 14% to 20% chromium, from 6% to 22% nickel, from 6% to 18% manganese, up to 8% "equivalent molybdenum," from 0.4% to 2% tantalum, up to .1% carbon, up to .2% nitrogen, up to 1% silicon, up to .01% boron, up to .02% zirconium, and the balance iron with small amounts of incidental impurities, the alloy comprising up to about 10% delta ferrite.

3. A stainless steel base metal alloy composition characterized by good resistance to hot cracking and corrosion, and having relatively high strength, composed of, by weight, 14% to 18% chromium, 12% to 16% nickel, 9% to 15% manganese, 0.3% to 1.0% tantalum, 1% to 3.75% "equivalent molybdenum," less than 1% silicon, less than 0.08% carbon, up to 0.10% nitrogen, the total of carbon and nitrogen exceeding .06%, and the balance essentially iron except for incidental impurities.

4. A stainless steel alloy characterized by high resistance to intergranular corrosion and low susceptibility to hot cracking during cooling from the molten condition composed of, by weight, about 16% chromium, about 20% nickel, from 9% to 15% manganese, from 0.4% to 1% tantalum, from 1% to 3% "equivalent molybdenum," less than 0.5% silicon, up to 0.1% carbon, up to 0.1% nitrogen, the total of carbon and nitrogen exceeding 0.06%, and the balance iron except for incidental impurities.

5. A stainless steel alloy characterized by high resistance to intergranular corrosion and low susceptibility to hot cracking during cooling from the molten condition, composed of, by weight, about 16% chromium, about 20% nickel, from 6% to 18% manganese, from 0.4% to 1% tantalum, from 1% to 3.75% "equivalent molybdenum," less than 0.5% silicon, up to 0.1% carbon, up to 0.1% nitrogen, the total of carbon and nitrogen exceeding 0.06%, and the balance iron except for incidental impurities.

References Cited in the file of this patent
UNITED STATES PATENTS

| | | |
|---|---|---|
| 2,190,486 | Schafmeisler et al. | Feb. 13, 1940 |
| 2,772,155 | Eiserman et al. | Nov. 27, 1956 |
| 2,823,114 | Eberle | Feb. 11, 1958 |

FOREIGN PATENTS

| | | |
|---|---|---|
| 497,010 | Great Britain | Dec. 9, 1938 |

OTHER REFERENCES

Maurer: High Chromium Iron and Steels, Metal Progress, May 1937, page 536.